(12) United States Patent
Driessen

(10) Patent No.: US 9,403,549 B2
(45) Date of Patent: Aug. 2, 2016

(54) FRAME AND PUSHCHAIR OR BUGGY PROVIDED WITH A TELESCOPIC PUSH BAR

(71) Applicant: MUTSY B.V., Goirle (NL)

(72) Inventor: Franciscus Johannes Cornelius Driessen, Goirle (NL)

(73) Assignee: Mutsy B.V. (NL)

(*) Notice: Subject to any disclaimer, the term of this patent is extended or adjusted under 35 U.S.C. 154(b) by 0 days.

(21) Appl. No.: 14/428,142

(22) PCT Filed: Sep. 13, 2013

(86) PCT No.: PCT/NL2013/050663
§ 371 (c)(1),
(2) Date: Mar. 13, 2015

(87) PCT Pub. No.: WO2014/051422
PCT Pub. Date: Apr. 3, 2014

(65) Prior Publication Data
US 2015/0266493 A1 Sep. 24, 2015

(30) Foreign Application Priority Data
Sep. 13, 2012 (NL) ...................... 2009460

(51) Int. Cl.
*B62B 7/10* (2006.01)
*B62B 9/20* (2006.01)

(52) U.S. Cl.
CPC ... *B62B 7/10* (2013.01); *B62B 9/20* (2013.01); *B62B 2205/20* (2013.01)

(58) Field of Classification Search
CPC .............. B62B 7/10; B62B 7/08; B62B 7/06; B62B 7/00; B62B 7/068; B62B 7/064; B62B 7/066; B62B 7/105; B62B 5/06; B62B 5/064; B62B 5/065; B62B 9/20; B62B 2205/20
See application file for complete search history.

(56) References Cited

U.S. PATENT DOCUMENTS

| | | | | |
|---|---|---|---|---|
| 3,504,925 A | * | 4/1970 | Glaser ....................... | B62B 7/08 280/650 |
| 5,516,142 A | * | 5/1996 | Hartan ...................... | B62B 7/06 280/642 |
| 6,312,005 B1 | * | 11/2001 | Lin ........................... | B62B 7/08 280/642 |
| 6,428,034 B1 | * | 8/2002 | Bost .......................... | B62B 7/08 280/47.4 |
| 7,370,877 B2 | * | 5/2008 | Refsum ................. | F16B 7/1463 280/47.315 |

(Continued)

FOREIGN PATENT DOCUMENTS

| | | |
|---|---|---|
| DE | 202005008370 U1 | 10/2005 |
| DE | 202005013899 U1 | 11/2005 |

(Continued)

OTHER PUBLICATIONS

International Search Report and Written Opinion mailed Jan. 3, 2014 (PCT/NL2013/050663); ISA/EP.

*Primary Examiner* — James M Dolak
(74) *Attorney, Agent, or Firm* — Banner & Witcoff, Ltd.

(57) ABSTRACT

The present invention relates to a frame for a pushchair or buggy which is provided with a telescopic push bar. The invention likewise relates to a pushchair or buggy with such a frame. According to the present invention use is made of a telescopic push bar in combination with a tiltable upper tube in which the push bar is received. The upper tube can tilt here to the lower tube, after which the entity of upper tube and lower tube can tilt to the lower frame part.

17 Claims, 10 Drawing Sheets

(56) References Cited

U.S. PATENT DOCUMENTS

| | | | |
|---|---|---|---|
| 7,396,038 B2 * | 7/2008 | Zweideck | B62B 7/08 280/47.38 |
| 7,562,895 B2 * | 7/2009 | Santamaria | B62B 7/068 280/47.38 |
| 7,712,765 B2 * | 5/2010 | Chen | B62B 9/20 280/642 |
| 7,883,104 B2 * | 2/2011 | Driessen | B62B 7/08 280/642 |
| 8,186,706 B2 * | 5/2012 | Dotsey | B62B 7/10 280/47.38 |
| 8,430,420 B2 * | 4/2013 | Chen | B62B 7/083 280/647 |
| 9,266,549 B2 * | 2/2016 | Jane Santamaria | B62B 7/06 |
| 2006/0125211 A1 | 6/2006 | Jane Santamaria et al. | |
| 2010/0001492 A1 * | 1/2010 | Driessen | B62B 7/145 280/642 |
| 2011/0304124 A1 | 12/2011 | Chen et al. | |

FOREIGN PATENT DOCUMENTS

| | | |
|---|---|---|
| FR | 2708550 A1 | 2/1995 |
| WO | 2009089540 A2 | 7/2009 |
| WO | 2012036542 A1 | 3/2012 |
| WO | 2012036543 A1 | 3/2012 |

* cited by examiner

Fig. 1

PRIOR ART

Fig. 2A

PRIOR ART

Fig. 2B

PRIOR ART

FRAME AND PUSHCHAIR OR BUGGY PROVIDED WITH A TELESCOPIC PUSH BAR

The present application is a U.S. National Phase filing of International Application No. PCT/NL2013/050663, filed on Sep. 13, 2013, designating the United States of America and claiming priority to NL Patent Application No. 2009460 filed Sep. 13, 2012. The present application claims priority to and the benefit of all the above-identified applications, which are all incorporated by reference herein in their entireties.

The present invention relates to a frame for a pushchair or buggy which is provided with a telescopic push bar. The invention likewise relates to a pushchair or buggy with such a frame.

A pushchair or buggy has a frame on which further components, such as a child seat or carrycot, can optionally be mounted. In the case of a buggy these components are often integrally connected. It is further desirable for the pushchair or buggy to comprise a telescopically adjustable push bar which enables the user to adjust the height of the push bar to for instance his/her own height.

The known pushchair and buggy are often collapsible. The space taken up can hereby be reduced, whereby the pushchair or buggy can be transported more easily, for instance in a car. The trend here is that the occupied space has to be made as small as possible without this detracting from the functionality of the pushchair or buggy. The telescopically adjustable push bar is an important feature here which is considered by most users to be highly desirable, if not indispensable.

Figure 1:
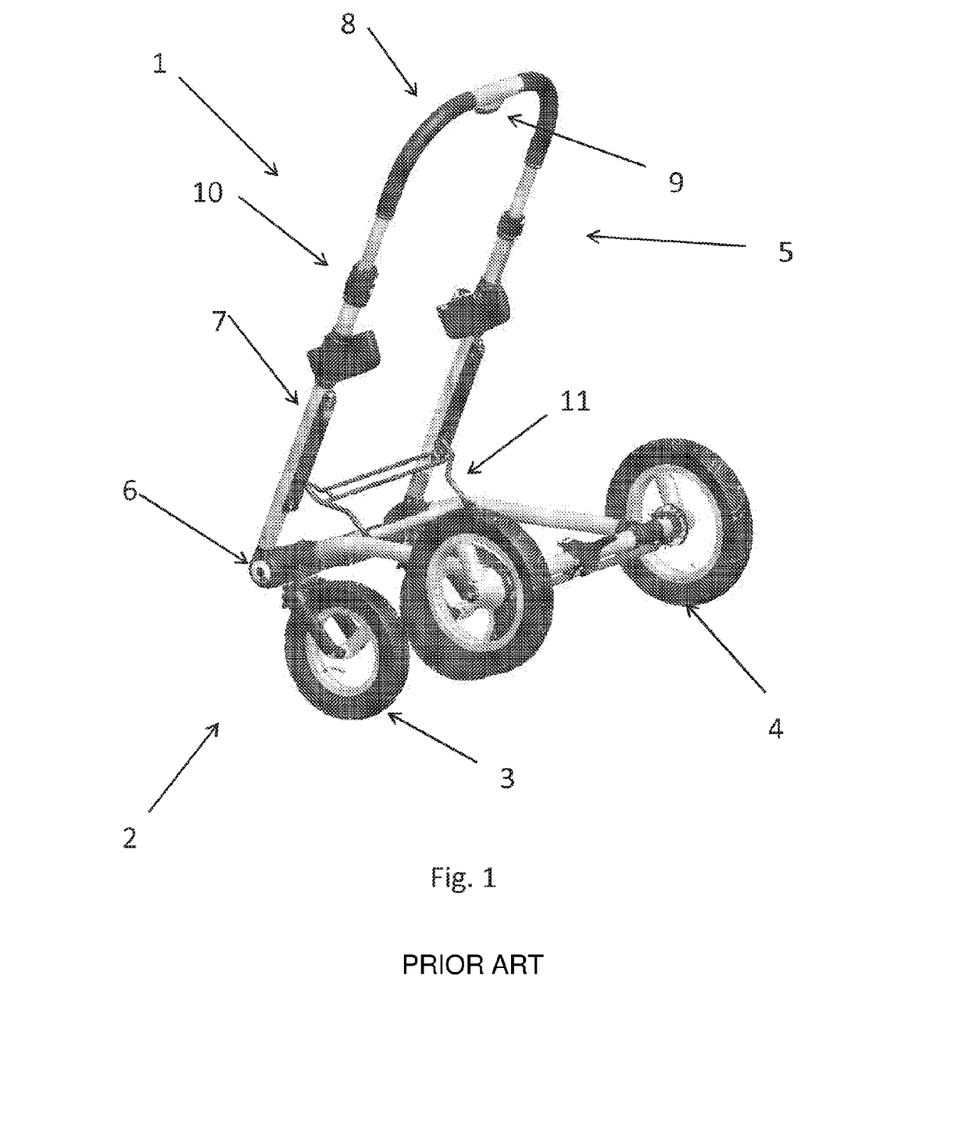
FIG. 1 shows a prior art pushchair.

FIG. 1 shows a known pushchair marketed by the applicant of the present invention under the name "4Rider". The pushchair comprises a frame 1 to which a child seat or carrycot can be coupled. Frame 1 comprises a lower frame part 2 which is provided with front wheels 3 and rear wheels 4.

Frame 1 further comprises an upper frame part 5 which is coupled pivotally to lower frame part 2 by means of hinge 6.

Upper frame part 5 comprises a first tube part 7 in which a push bar 8 is telescopically adjustable. The height position of push bar 8 can be determined here by the user pushing a button 9 which unlocks the locking of the telescopic movement of push bar 8 in first tube part 7.

The frame 1 shown in FIG. 1 is collapsible. For this purpose the user operates button 9, whereby push bar 8 can be pushed downward. The user then operates a sliding sleeve 10. Operation of sliding sleeve 10 unlocks a locking which prevents further movement of push bar 8 in first tube 7. Operation of sliding sleeve 10 enables further downward movement of push bar 8.

The rotation of upper frame part 5 and lower frame part 2 is locked. Use is made for this purpose of a support structure 11 which is mounted slidably and pivotally in upper frame part 5 on an upper side and mounted pivotally on lower frame part 2 on an underside. During relative rotation of lower frame part 2 and upper frame part 5 the support structure 11 will slide in a slot of upper frame part 5. Support structure 11 imparts the necessary stiffness to the pushchair.

In the known pushchair relative rotation of lower frame part 2 and upper frame part 5 is locked in that the displacement of support structure 11 is blocked. This blocking can be released by a metal locking plate being rotated aside by the telescopic' push bar 8.

In the known pushchair the relative rotation of lower frame part 2 and upper frame part 5 is unlocked in that, as push bar 8 is moved further downward following operation of sliding sleeve 10, an outer end of push bar 8 pushes the locking plate aside and so releases the blocking of support structure 11.

An advantage of the above stated pushchair is that it takes a substantially open form at the rear and on both sides, whereby much possible storage space is available.

Another pushchair is known from PCT/NL2011/000067. This pushchair is collapsible in three dimensions. A push bar is provided here which can be tilted forward, whereby the length of the upper frame part is effectively halved. The pushchair comprises a dual locking which a user has to operate in order to tilt the push bar. This pushchair further comprises a lower frame part coupled pivotally on the front side thereof to the upper frame part. As in the above mentioned pushchair, a support structure is provided which is blocked. An operating element for releasing this blocking only becomes available to a user once the push bar has been tilted. This pushchair is however not provided with a telescopic push bar.

A further pushchair is known from US 2011304124. This pushchair is collapsible in height direction by means of across construction. The pushchair comprises for this purpose a cross construction on both sides of the pushchair, wherein a front wheel and a rear wheel are mounted on different arms of the cross construction. These arms are mounted pivotally at the point where they intersect. The arm to which a rear wheel is coupled ends in a hinge to which an upper tube is pivotally coupled. A push bar is received telescopically in this upper tube. The upper tube can be tilted in the direction of the rear wheel by moving the push bar downward.

A drawback of the above stated pushchair is that the cross construction takes up a lot of space in which a shopping bag or a bag with a child's things could for instance have been stored.

Figure 2A:
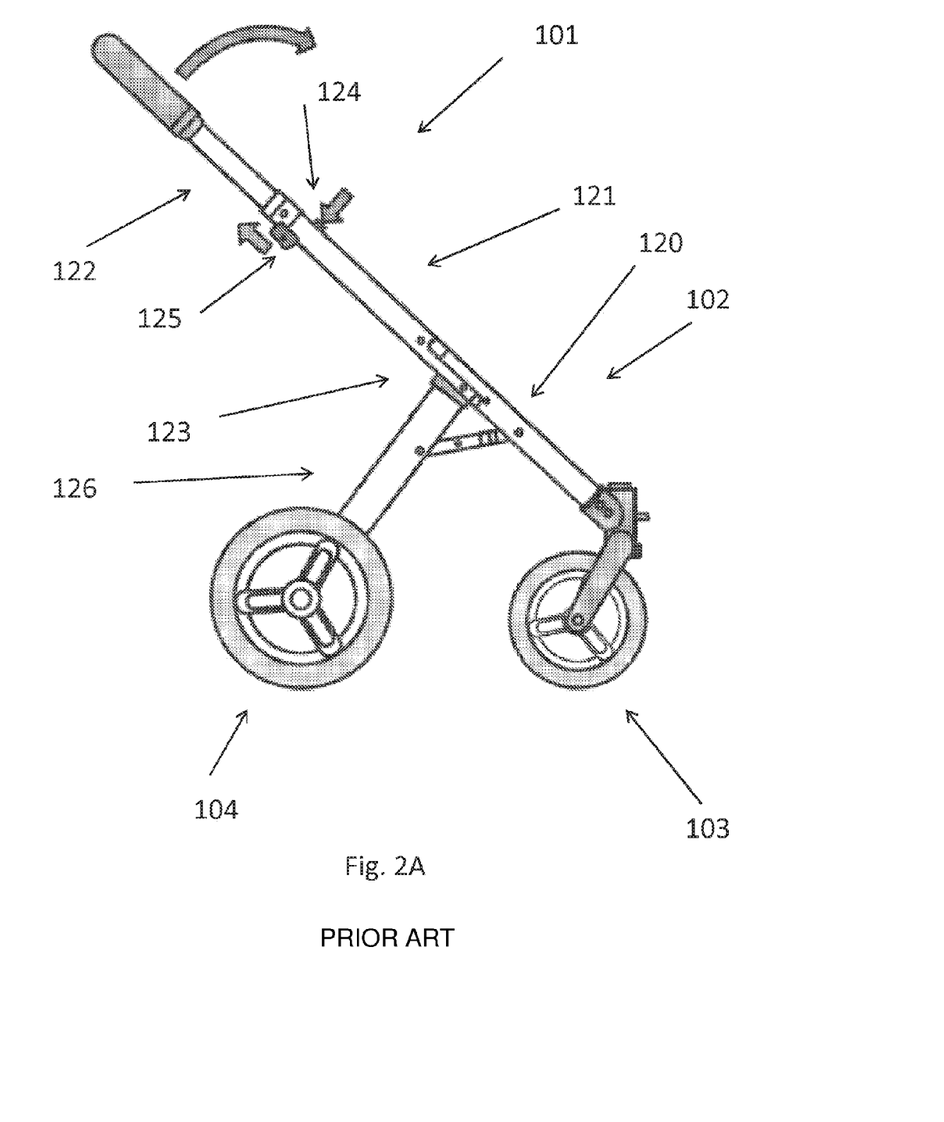
FIGS. 2A and 2B show a further prior art pushchair in respectively folded open and collapsed position.

FIG. 2A shows a pushchair with a frame part corresponding to the preamble of claim 1. The pushchair shown in FIG. 2A is marketed by the applicant of the present invention under the name "Transit".

The pushchair comprises a frame 101 to which a child seat or carrycot can be coupled. Frame 101 comprises a lower frame part 102 provided with front wheels 103 and rear wheels 104.

Frame 101 further comprises a lower tube 120 which is connected tiltably to an upper tube 121. Tubes 120, 121 form part of a frame part. A push bar 122 can move telescopically here in upper tube 121. Frame 101 further comprises locking means (not shown) for locking push bar 122 in the height in upper tube 121. These locking means can be operated by pressing a button placed on the push bar (not shown).

Frame 101 further comprises a hinge 123 which enables tilting of upper tube 121 and lower tube 120.

Frame 101 further comprises first blocking means for blocking the relative tilting of upper tube 121 and lower tube 120. These means can be operated by means of a dual locking formed by operating elements 124, 125. These elements co-act in the sense that a user has to operate both elements in order to operate the blocking means and thus release the relative tilting of upper tube 121 and lower tube 120. Following this release push bar 122 and upper tube 121 can be tilted forward.

Figure 2B:
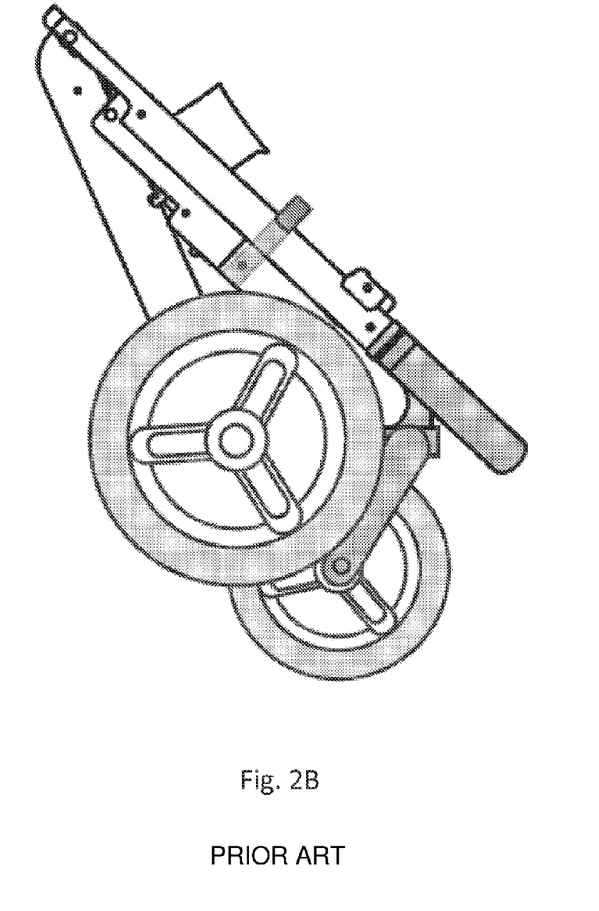

Owing to the structure of hinge 123 rear arm 126 will tilt toward front wheel 103 when upper tube 121 is tilted forward, whereby frame 101 collapses. This situation is shown in FIG. 2B.

This latter known pushchair has the desired telescopic push bar and is collapsible. However, this pushchair uses a rear arm in order to achieve the collapsibility. Such an arm blocks to a considerable extent the access to the space under a child seat. As a result less space is available in the pushchair or buggy for carrying for instance shopping.

Another drawback of the latter known pushchair is that in practical situations the tilting of the push bar comprises three different operations. The height position of the push bar has first to be unlocked such that the push bar can be pushed in. The two operating elements 124, 125 then have to be operated for the purpose of releasing the tilting movement.

The present invention has for its object to provide a collapsible pushchair or buggy with telescopic push bar wherein the above stated drawback does not occur, or hardly so.

A further object of the invention is to provide a collapsible, telescopically adjustable pushchair, wherein sufficient space is available at both the rear and the sides of the pushchair for storage of objects.

These objectives are at least partially achieved with the frame according to claim 1.

The frame according to the invention comprises a lower frame part provided with at least one rear wheel and at least one front wheel and an upper frame part which is mounted tiltably on the lower frame part on a front side of the lower frame part. The upper frame part here comprises a lower tube, an upper tube which is connected tiltably to the lower tube, a push bar which can move telescopically in the upper tube, locking means for locking the push bar in the height in the upper tube, and first blocking means for blocking the relative tilting of the upper tube and the lower tube.

The above stated measures achieve that a large amount of space can be made available for storage. The combination of a telescopic push bar and a tiltable upper tube achieves on the one hand that there are sufficient adjustment options for the user in respect of the height of the push bar. This combination on the other hand provides an exceptionally compact entity in the collapsed position. This is partially due to the fact that the lower and upper frame parts are pivotally coupled on the front side of the pushchair. This in contrast to known pushchairs based on a cross construction.

It is recommended that, at least during use, the lower tube and upper tube lie in one line, wherein the upper tube can be tilted by being moved forward in the direction of the front wheels.

It is further advantageous for the lower frame part to comprise hinges at the front on either side of the lower frame part, by means of which hinges the lower frame part and the upper frame part are tiltably coupled, wherein the rear wheels have a fixed position relative to the hinges. The front wheels can take a swivelling form here.

As a result of the above construction the undercarriage extends substantially in a horizontal plane and the upper carriage, at least during use, extends obliquely upward from the hinges. The intended open construction providing sufficient storage space is hereby obtained.

It is recommended that the frame comprises limiting means for limiting a penetration depth of an outer end of the push bar into the upper tube to a predetermined depth limit, and an operating element for operating the limiting means. The outer end of the push bar can be pushed here beyond the depth limit into the upper tube after operation of the operating element for the purpose of engaging the first blocking means. The first blocking means are further configured to release the relative tilting of the upper tube and the lower tube when engaging with the outer end of the push bar.

In contrast to the above mentioned pushchair known under the name "Transit", the tilting of the push bar comprises only two operations. The height position of the push bar first has to be unlocked such that the push bar can be pushed in. A user then operates the operating element for the purpose of operating the limiting means, after which the push bar can be pushed further. This latter likewise forms the unlocking of the tilting movement. Compared to the "Transit" pushchair it is therefore possible to dispense with a locking mechanism in order to achieve a dual locking. In addition, the push bar is necessarily always in the furthest pushed-in position during tilting, this in contrast to the above mentioned pushchair.

In contrast to the above mentioned pushchair known under the name "4Rider", the push bar is not used to release the tilting of a lower frame part and an upper frame part, but tilting of the push bar is released.

The pushchair or buggy is preferably configured to be displaceable in a forward direction when the wheels of the pushchair or buggy are not turned, wherein the upper tube can be tilted downward and in the direction of the lower tube over an axis perpendicular to the forward direction, which preferably runs horizontally, at least in normal use.

The frame part preferably further comprises an operating element placed in or on the push bar for the purpose of operating the locking means.

The lower tube preferably comprises a first engaging element and the upper tube a second engaging element, for instance in the form of hooks. The engaging elements are preferably configured to engage each other for the purpose of said blocking of the relative tilting of the upper tube and the lower tube. The first and/or second engaging element is configured here for the purpose, when the outer end of the push bar engages the second engaging element, of breaking the mutual engagement of the first and second engaging elements for said release of the relative tilting of the upper tube and the lower tube.

During tilting of upper tube and lower tube from a tilted position to a non-tilted position these engaging elements are preferably configured to engage each other for said blocking of the relative tilting of the upper tube and the lower tube. It is noted here that in an advantageous embodiment the upper tube and lower tube lie in line in the non-tilted position.

The upper tube can be provided here with a resilient element for placing the push bar under spring tension, at least when it is pushed beyond the depth limit into the upper tube. The spring tension can already act before this limit has been reached. If the push bar can be locked in a lower position relative to the upper tube, the resilient element can be configured to push the push bar into the lower position. This has the advantage that, after the engaging elements no longer engage each other and the upper tube and lower tube can be tilted, the push bar automatically locks in the lower position in the upper tube.

The frame preferably comprises second blocking means for blocking the relative tilting of the upper frame part and the lower frame part, and an operating element for operating the second blocking means. The operating element is configured here so that it can be operated only after tilting of the upper tube. This latter aspect is for instance achieved if the operating element for operating the second blocking means is at least partially received in the upper tube in non-tilted position of the upper tube and lower tube. Instead of or additionally to this a movement of the operating element can be prevented or limited in a non-tilted position of the upper tube.

The frame can comprise a connecting arm placed between the upper frame part and the lower frame part. The connecting arm is connected pivotally here to one of the lower and upper frame part and coupled slidably and pivotally to the other of the lower and upper frame part. The second blocking means for blocking the relative tilting of the upper frame part and the lower frame part are configured here to block a sliding movement of the connecting arm.

The upper and lower frame parts can preferably tilt relative to each other over an axis perpendicular to the forward direction.

According to a second aspect, the invention provides a pushchair or buggy comprising the above described frame.

The invention will be discussed in more detail hereinbelow with reference to the accompanying figures, wherein.

Figure 3:
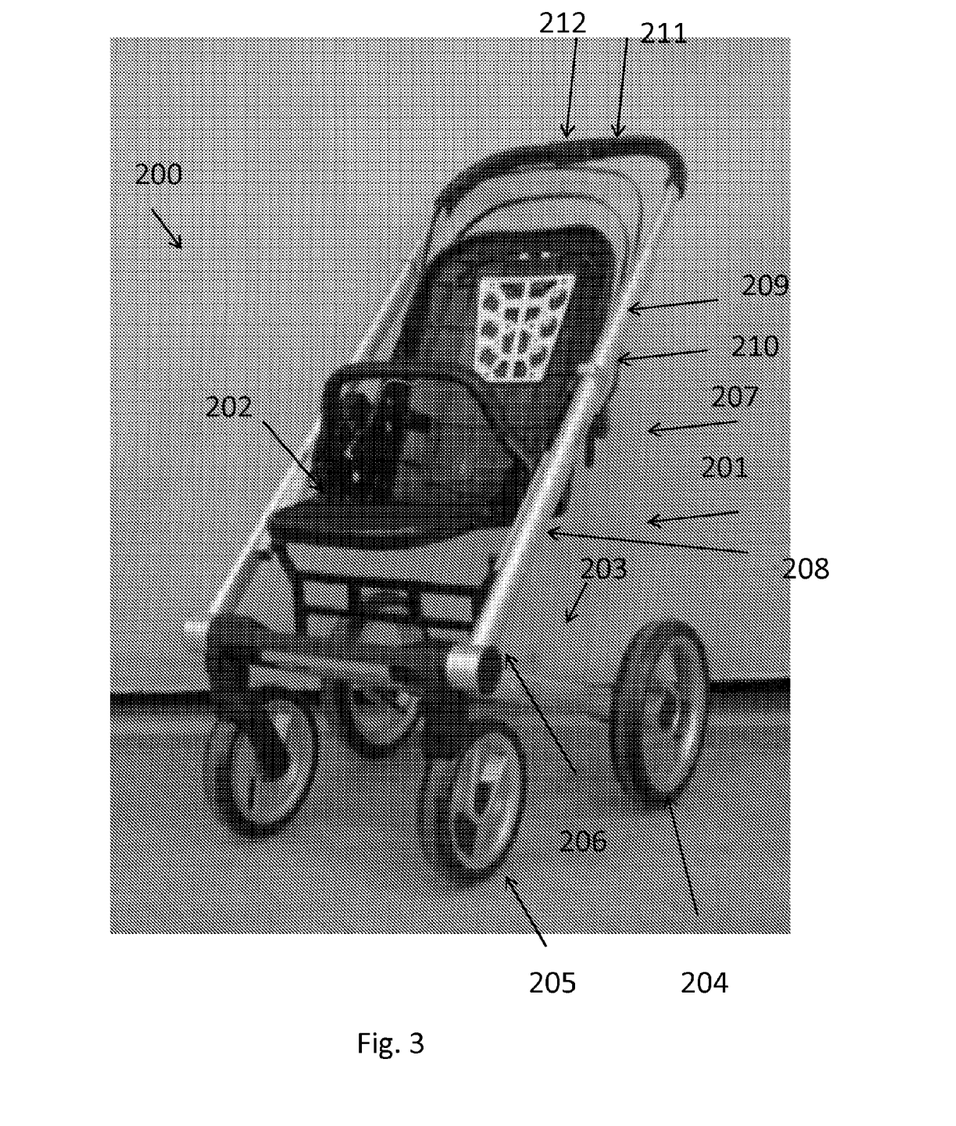
FIG. 3 shows an embodiment of a pushchair according to the invention.

FIG. 3 shows an embodiment of a pushchair 200 according to the invention. This comprises a frame 201 on which a seat 202 is mounted. Frame 201 comprises a lower frame part 203 provided with rear wheels 204 and front wheels 205. Lower frame part 203 is coupled tiltably to an upper frame part 207 by means of hinges 206.

Upper frame part 207 comprises a lower tube 208 and an upper tube 209 which are connected tiltably to each other by means of hinge 210. Received in upper tube 209 is a push bar 211 which is telescopically adjustable by means of operating an operating element 212.

Figure 4:
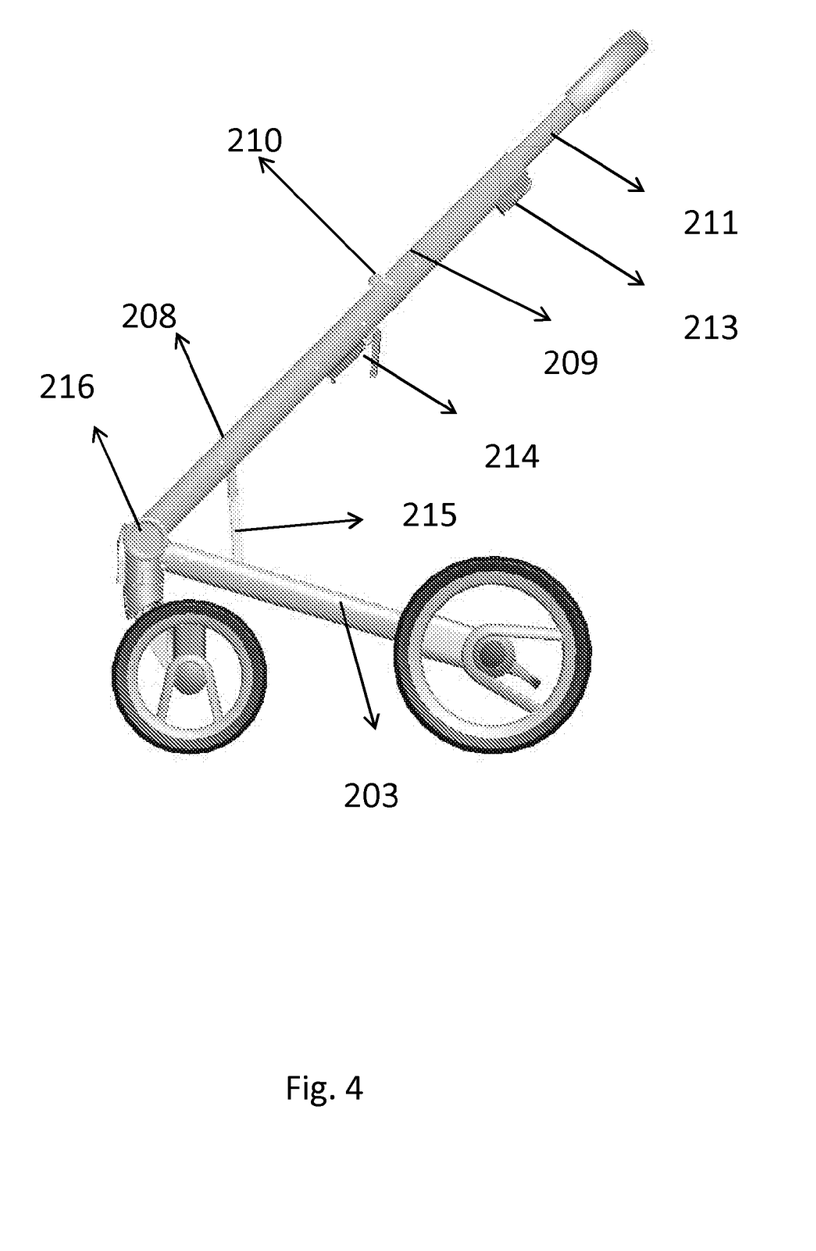
FIG. 4 shows a side view of the pushchair in FIG. 3 in non-tilted position.
Figure 7:
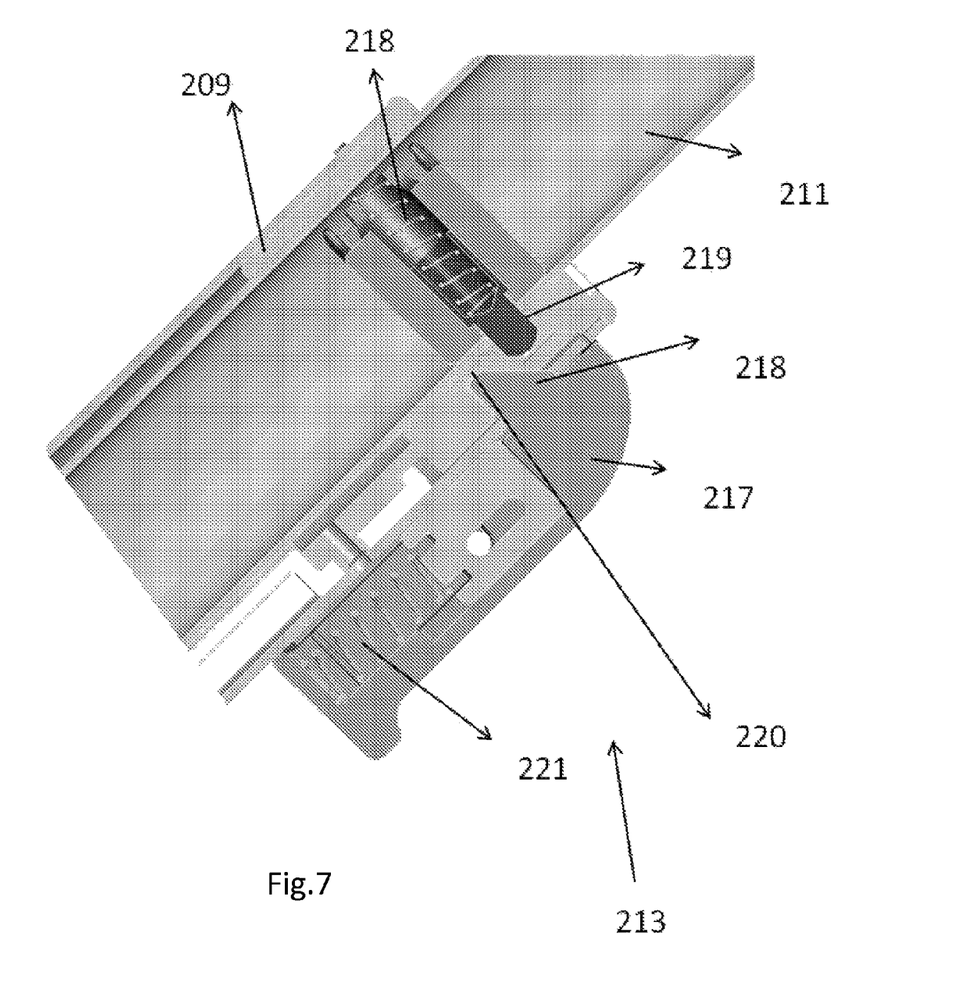
FIG. 7 shows a cross-section of the upper tube of the frame of the pushchair of FIG. 3 at the position of an operating element.

The side view in FIG. 4 shows an operating element 213 which is shown in more detail in FIG. 7. This operating element operates limiting means which are configured to limit the movement of push bar 211 in upper tube 209.

FIG. 4 further shows an operating element 214 which can be used to release the blocking of connecting arm 215. This latter arm is connected pivotally to lower frame 203 at pivot point 216. Arm 215 can further slide in lower tube 208. It must be noted that arm 215 will also pivot during the sliding in lower tube 208.

Operating element 214 can be used to release the blocking of the sliding movement of arm 215. Lower frame part 203 and upper frame part 207 can then tilt relative to each other.

Figure 5:
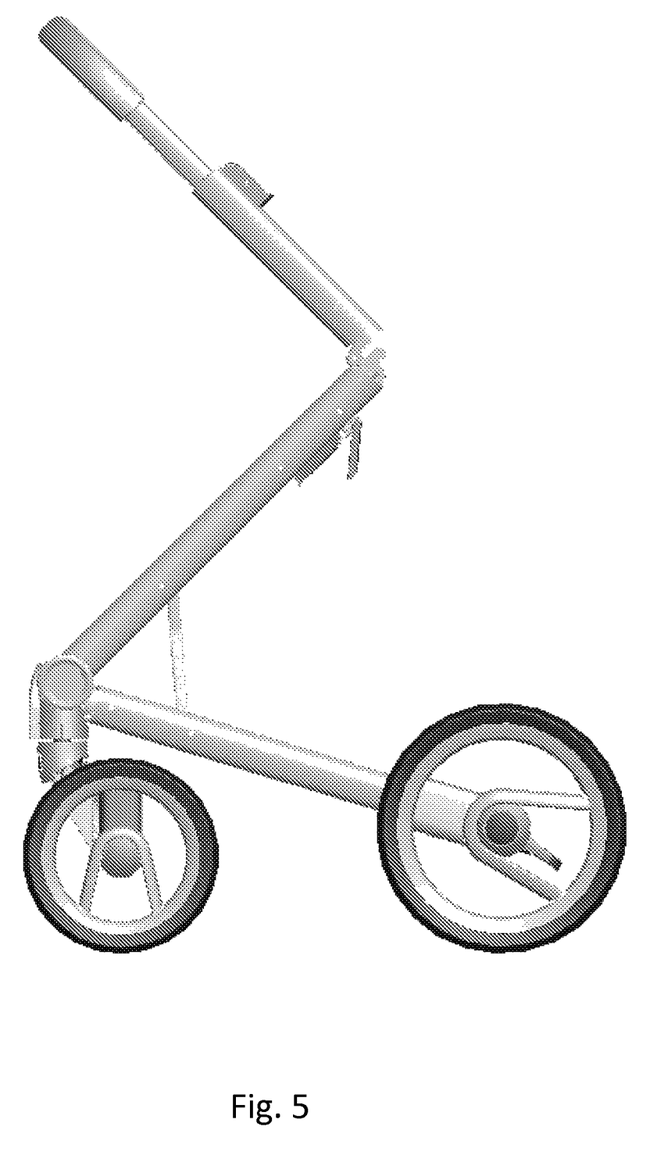
FIG. 5 shows a side view of the pushchair in FIG. 3 in partially tilted position.

The collapsing of frame 201 will now be briefly described. A user first operates operating element 212, after which push bar 211 can be pushed in. Additionally or hereafter operating element 213 is operated so as to leave clear the passage in upper tube 209. It hereby becomes possible to move push bar 211 beyond the depth limit. The tilting movement between upper tube 209 and lower tube 208 is hereby released. The user can now tilt upper tube 209 forward as shown in FIG. 5. The tilting movement makes it possible to operate operating element 214. This element is not functional when lower tube 208 and upper tube 209 are locked.

Figure 6:
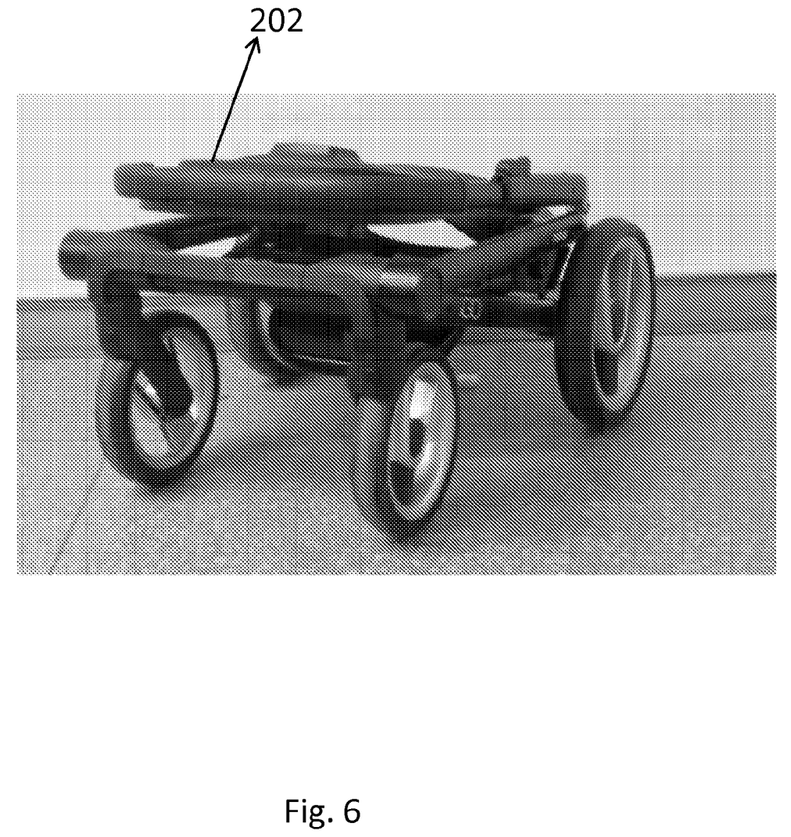
FIG. 6 shows the pushchair of FIG. 3 in collapsed position.

Following tilting of upper tube 209 the user can use operating element 214, whereby upper frame part 207 can tilt in the direction of lower frame part 203. The collapsed position as shown in FIG. 6 is eventually obtained.

FIG. 7 shows a detail section at the position of operating element 213. This operating element comprises a pin 219 and a sliding part 217 provided with an edge 218.

FIG. 7 illustrates a blocked position. The movement of push bar 211 is limited in that it comes up against a sharp edge 220. When sliding part 217 is moved upward it will push pin 219 inward by means of edge 218. Push bar 211 can hereby be pushed further into upper tube 209. A spring 221 provides for a spring tension which urges sliding part 217 to move to the situation as shown in FIG. 7. A user thus has to move sliding part 217 upward counter to spring tension.

Figure 8:
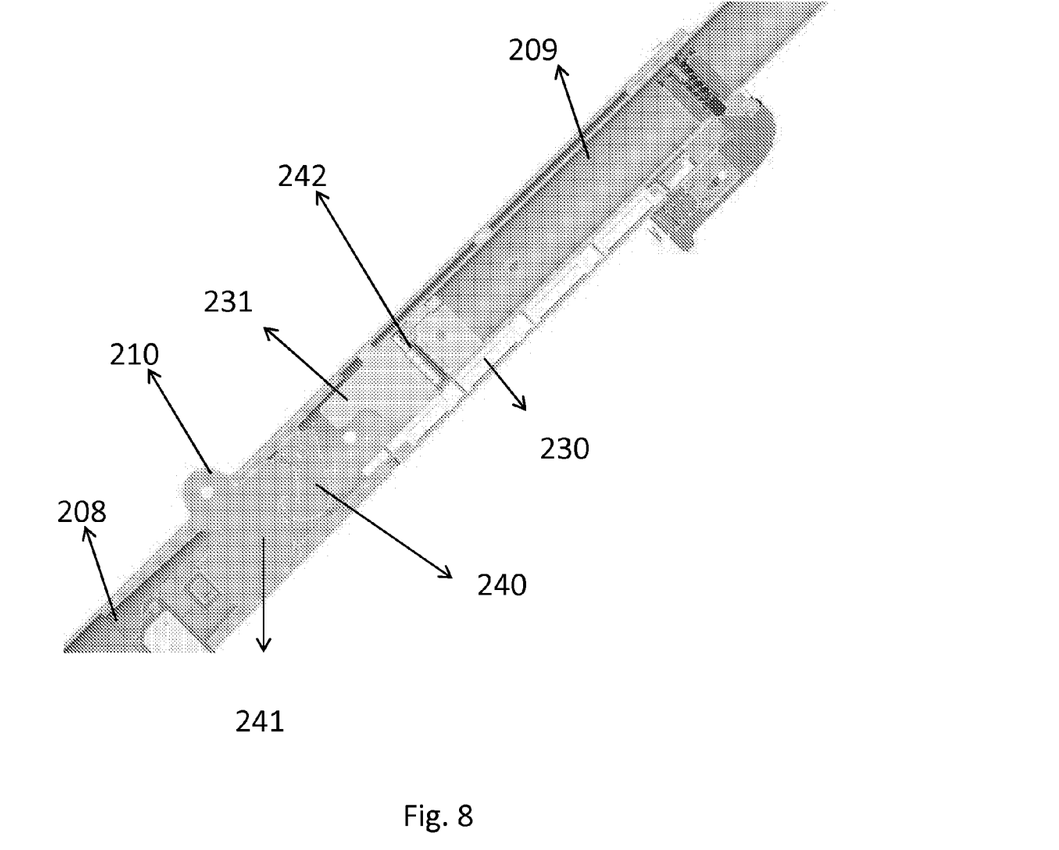
FIG. 8 shows a cross-section of a part of the lower tube and the upper tube of the pushchair of FIG. 3.

FIG. 8 shows upper tube 209 and lower tube 208 in locked position. This figure shows how an outer end 231 of push bar 211 can engage on two engaging elements 240 and 241. When push bar 211 is moved further downward in FIG. 8 it will engage engaging element 240, whereby this latter will rotate out of engagement with engaging element 241. The relative tilting between lower tube 208 and upper tube 209 is hereby released. Also drawn are structures 230 which can co-act with catch 242 for the purpose of locking push bar 211 in the height in per se known manner.

Figure 9:
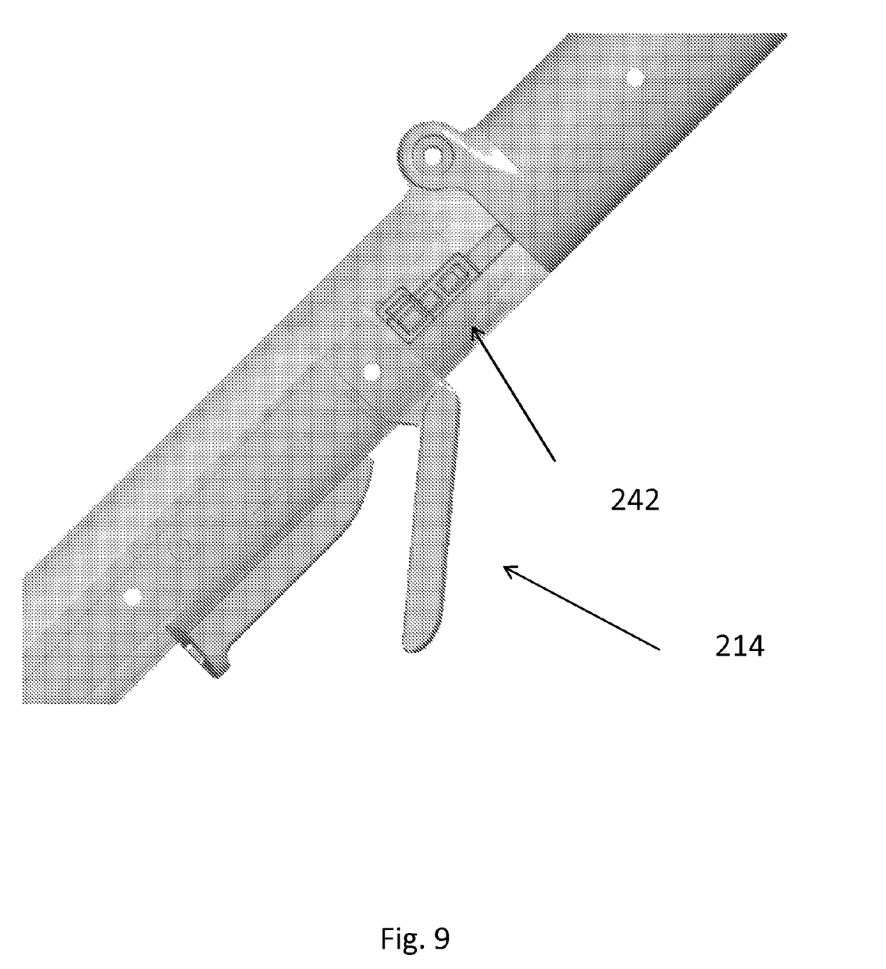
FIG. 9 shows a cross-section of the lower tube of the pushchair of FIG. 3 at the position of a further operating element.

FIG. 9 shows operating element 214 which can be used to release the blocking of connecting arm 215. The mutually facing ends of lower tube 208 and upper tube 209 have an aluminium hinge part with which the two are connected. In the lower hinge part of lower tube 208 there is a plastic plunger 242 in addition to engaging element 241. This element lies against operating element 214 with which the upper frame part 207 is unlocked relative to the lower frame part 203. When lower tube 208 and upper tube 209 lie in line, operating element 214 cannot be operated, for instance by squeezing, because plunger 242 cannot move because it comes up against the upper hinge part in upper tube 209. Only when this hinge part is rotated away by upper tube 209 being tilted away does plunger 242 have enough space to be pressed outward by operating element 214. Operating element 214 can in this case now be operated, whereby the relative tilting of lower frame part 203 and upper frame part 207 is released. The actual release of the blocking of connecting arm 215 takes place in a per se known manner, for instance with a cable transmission.

The invention is elucidated in the foregoing on the basis of embodiments. It will be apparent to the skilled person that the scope of protection is not limited hereto but is defined by the following claims.

The invention claimed is:

1. A frame for a pushchair or buggy, comprising:
 a lower frame part provided with at least one rear wheel and at least one front wheel;
 an upper frame part which is mounted tiltably on the lower frame part on a front side of the lower frame part, the upper frame part comprising:
 a lower tube;
 an upper tube which is connected tiltably to the lower tube;
 a push bar which can move telescopically in the upper tube;
 locking means for locking the push bar height in the upper tube;
 first blocking means for blocking the relative tilting of the upper tube and the lower tube;
 limiting means for limiting a penetration depth of an outer end of the push bar into the upper tube to a predetermined depth limit; and
 an operating element for operating the limiting means;
 wherein the outer end of the push bar can be pushed beyond the depth limit into the upper tube after operation of the operating element for the purpose of engaging the first blocking means, and wherein the first blocking means release the relative tilting of the upper tube and the lower tube when engaging with the outer end of the push bar.

2. The frame, as claimed in claim 1, wherein at least during use, the lower tube and upper tube lie in one line, and wherein the upper tube can be tilted by being moved forward in the direction of the front wheels.

3. The frame, as claimed in claim 1, wherein the lower frame part comprises hinges at the front on either side of the lower frame part, by means of which hinges the lower frame part and the upper frame part are tiltably coupled, wherein the rear wheels have a fixed position relative to the hinges.

4. The frame, as claimed in claim 3, wherein the front wheels take a swiveling form.

5. The frame, as claimed in claim 1, wherein the pushchair or buggy is displaceable in a forward direction when the wheels of the pushchair or buggy are not turned, wherein the upper tube can be tilted downward and in the direction of the lower tube over an axis perpendicular to the forward direction.

6. The frame, as claimed in claim 1, further comprising an operating element placed in or on the push bar for the purpose of operating the locking means.

7. The frame, as claimed in claim 1, wherein the lower tube comprises a first engaging element and the upper tube comprises a second engaging element, which engaging elements engage each other for the purpose of said blocking of the relative tilting of the upper tube and the lower tube, wherein the first and/or second engaging element is configured for the purpose, when the outer end of the push bar engages the second engaging element, of breaking the mutual engagement of the first and second engaging elements for said release of the relative tilting of the upper tube and the lower tube.

8. The frame, as claimed in claim 7, wherein during tilting of upper tube and lower tube from a tilted position to a non-tilted position the engaging elements engage each other for said blocking of the relative tilting of the upper tube and the lower tube.

9. The frame, as claimed in claim 7, wherein the upper tube is provided with a resilient element for placing the push bar under spring tension, at least when it is pushed beyond the depth limit into the upper tube.

10. The frame, as claimed in claim 9, wherein the push bar is lockable in a lower position relative to the upper tube, and wherein the resilient element pushes the push bar into the lower position.

11. The frame, as claimed in claim 1, further comprising:
    second blocking means for blocking the relative tilting of the upper frame part and the lower frame part;
    an operating element for operating the second blocking means, which operating element can be operated only after tilting of the upper tube.

12. The frame, as claimed in claim 11, wherein the operating element for operating the second blocking means is at least partially received in the upper tube in a non-tilted position of the upper tube and lower tube and wherein a movement of the operating element is prevented or limited in the non-tilted position of the upper tube.

13. The frame, as claimed in claim 1, comprising a connecting arm between the upper frame part and the lower frame part, which connecting arm is connected pivotally to one of the lower and upper frame part and coupled slidably and pivotally to the other of the lower and upper frame part, wherein the second blocking means for blocking the relative tilting of the upper frame part and the lower frame part block a sliding movement of the connecting arm.

14. The frame, as claimed in claim 5, wherein the upper and lower frame parts can tilt relative to each other over an axis perpendicular to the forward direction.

15. The pushchair or buggy comprising the frame of claim 1.

16. The frame, as claimed in claim 2, wherein the lower frame part comprises hinges at the front on either side of the lower frame part, by means of which hinges the lower frame part and the upper frame part are tiltably coupled, wherein the rear wheels have a fixed position relative to the hinges.

17. The frame as claimed in claim 8, wherein the upper tube is provided with a resilient element for placing the push bar under spring tension, at least when it is pushed beyond the depth limit into the upper tube.

* * * * *